United States Patent
Ahn et al.

(10) Patent No.: US 10,810,276 B2
(45) Date of Patent: Oct. 20, 2020

(54) MEDIATING METHOD AND DEVICE

(71) Applicant: HYPERCONNECT, INC., Seoul (KR)

(72) Inventors: Sangil Ahn, Cheongju-si (KR); Kangsik Jung, Seoul (KR); Hyountaek Yong, Seoul (KR)

(73) Assignee: HYPERCONNECT, INC., Seoul (KR)

( * ) Notice: Subject to any disclaimer, the term of this patent is extended or adjusted under 35 U.S.C. 154(b) by 0 days.

(21) Appl. No.: 16/705,491

(22) Filed: Dec. 6, 2019

(65) Prior Publication Data

US 2020/0110788 A1 Apr. 9, 2020

Related U.S. Application Data

(63) Continuation of application No. PCT/KR2018/001315, filed on Jan. 31, 2018.

(30) Foreign Application Priority Data

Jun. 7, 2017 (KR) ........................ 10-2017-0070573

(51) Int. Cl.
  *G06F 16/9536* (2019.01)
  *G06F 16/9538* (2019.01)
  *H04N 7/14* (2006.01)

(52) U.S. Cl.
  CPC ...... *G06F 16/9536* (2019.01); *G06F 16/9538* (2019.01); *H04N 7/147* (2013.01)

(58) Field of Classification Search
  CPC combination set(s) only.
  See application file for complete search history.

(56) References Cited

U.S. PATENT DOCUMENTS

| | | | | |
|---|---|---|---|---|
| 2009/0271244 A1* | 10/2009 | Kalasapur | ............ | G06Q 10/107 705/319 |
| 2012/0004954 A1* | 1/2012 | Eisinger | ............ | G06Q 30/0207 705/14.1 |
| 2016/0055571 A1* | 2/2016 | Wouhaybi | ........... | G06F 16/9535 705/12 |

FOREIGN PATENT DOCUMENTS

| | | |
|---|---|---|
| KR | 10-2009-0014473 A | 2/2009 |
| KR | 10-2013-0057936 A | 6/2013 |
| KR | 10-2014-0087175 A | 7/2014 |
| KR | 10-2015-0010988 A | 1/2015 |
| KR | 10-1700115 B1 | 2/2017 |

OTHER PUBLICATIONS

International Search Report for PCT/KR2018/001315 dated May 17, 2018 (PCT/ISA/210).
Written Opinion for PCT/KR2018/001315 dated May 17, 2018 (PCT/ISA/237).

* cited by examiner

*Primary Examiner* — Phung-Hoang J Nguyen
(74) *Attorney, Agent, or Firm* — Sughrue Mion, PLLC

(57) ABSTRACT

A mediating method by a mediating device comprises receiving a first list including at least one item from a first terminal and receiving at least one list from at least one terminal different from the first terminal, searching for a list including an item corresponding to at least one item among the at least one item of the first list, among the received at least one list, and transmitting information on the corresponded item, according to a result of the search, to each of the first terminal and a terminal which provides the list including the item corresponding to the at least one item among the at least one terminal.

7 Claims, 19 Drawing Sheets

Fig. 7

| LIST A | LIST B | LIST C |
|---|---|---|
| #PET #SNS #MUSIC<br>#BASEBALL | #SNS #ALCOHOL<br>#RESTAURANT #EXERCISE | #RELIGION #ALCOHOL<br>#RESTAURANT #ART<br>#EXERCISE |

Fig. 11

| LIST D | LIST E | LIST F |
|---|---|---|
| #PET #MOVIE #ROMANCE <br> #SNS #FOOD | #PET #EXERCISE #FOOD <br> #BASEBALL | #RELIGION #ALCOHOL <br> #RESTAURANT #ART #PET |

Fig. 12

| LIST G | LIST H | LIST I |
|---|---|---|
| #PET #MOVIE #ROMANCE<br>#SNS #FOOD | #PET #ROMANCE #FOOD<br>#BASEBALL | #RELIGION #ALCOHOL<br>#RESTAURANT #ART #PET |

Fig. 14

| | LIST J | |
|---|---|---|
| 1st RANK | #MOVIE | (SCORE: 80) |
| 2nd RANK | #ROMANCE | (SCORE: 40) |
| 3rd RANK | #RELIGION | (SCORE: 0) |
| TOTAL SCORES | 120 | |

| | LIST K | |
|---|---|---|
| 1st RANK | #PET | (SCORE: 100) |
| 2nd RANK | #MOVIE | (SCORE: 70) |
| 3rd RANK | #EXERCISE | (SCORE: 0) |
| TOTAL SCORES | 170 | |

| | LIST L | |
|---|---|---|
| 1st RANK | #ROMANCE | (SCORE: 50) |
| 2nd RANK | #PET | (SCORE: 90) |
| 3rd RANK | #RESTAURANT | (SCORE: 0) |
| TOTAL SCORES | 140 | |

MEDIATING METHOD AND DEVICE

CROSS-REFERENCE TO THE RELATED APPLICATION

This application is a continuation of International Application No. PCT/KR2018/001315, filed Jan. 31, 2018 which claims priority from Korean Patent Application No. 10-2017-0070573, filed on Jun. 7, 2017, in the Korean Intellectual Property Office, the disclosures of which are incorporated herein in their entirety by reference.

TECHNICAL FIELD

One or more embodiments relate to a mediating method and device, which are capable of efficiently mediating at least two terminals with one another.

BACKGROUND ART

With the development of communication technology and the miniaturization of electronic devices, easily portable personal terminals have become widespread to general consumers. In particular, portable personal terminals such as smartphones or smart tablets have been widely used in recent years. Most of the terminals include a communication function. A user may use a terminal to perform a search on the Internet or exchange messages with the other party.

The user and the other party may already be acquainted or may not be acquainted with each other. A mediating device may connect a plurality of terminals including the terminal of the user and the terminal of the other party with one another. The mediating device can mediate the terminal of the user and the terminal of the other party with each other. Therefore, even if the user and the other party do not know each other, they may exchange their messages with each other through mediating device.

DISCLOSURE

Technical Problem

One or more embodiments may provide a mediating method and device, which are capable of efficiently mediating a plurality of terminals with one another Further, one or more embodiments may provide a mediating method and device, which are capable of mediating an appropriate user among users of a plurality of terminals to match with a user of another terminal Further, one or more embodiments may provide a mediating method and device, which are capable of allowing each user of a plurality of terminals to expand her or his interpersonal relationship through a mediation service.

Technical Solution

According to an embodiment of the present disclosure, a mediating method may comprise receiving a first list including at least one item from a first terminal and receiving at least one list from at least one terminal different from the first terminal, searching for a list including an item corresponding to at least one item among the at least one item of the first list, among the received at least one list, and transmitting information on the corresponded item, according to a result of the search, to each of the first terminal and a terminal which provides the list including the item corresponding to the at least one item among the at least one terminal.

According to an embodiment of the present disclosure, the searching for the list may include searching for a second list including the same item as the at least one item of the first list, in which the number of the same item is a reference number or higher among the received at least one list and mediating the first terminal and a second terminal providing the second list among the at least one terminal. Further, the transmitting the information may include transmitting information on the same item between the first list and the second list to each of the first terminal and the second terminal.

According to an embodiment of the present disclosure, the searching for the list may further comprise selecting, when the number of lists including the same item in which the number of the same item is the reference number or higher is two or more among the received at least one list, a third list including the same item in which the number of the same item is highest among the two or more lists and mediating the first terminal and a third terminal providing the third list. Further, the transmitting the information may further comprise transmitting information on the same item between the first list and the third list to each of the first terminal and the third terminal.

According to an embodiment of the present disclosure, the searching for the list may include assigning different scores from each other, depending on the conformity degree between a priority rank-assigned item among the at least one item included in the first list and a priority rank-assigned item included in each of the received at least one list, to the items and selecting a second list among the received at least list based on the assigned scores.

According to an embodiment of the present disclosure, a list having the highest assigned score may be selected from the received at least one list as the second list.

According to an embodiment of the present disclosure, the at least one item included in the first list may correspond to at least one of gender information, private area information, school information, hobby information, specialty information, interest information, or religion information of a user of the first terminal.

According to an embodiment of the present disclosure, the searching for the list may include searching for a second list including the same item as a specified item designated by a mediating device, which is included in the first list among the received at least one list and mediating, when detecting the second list, the first terminal and a second terminal providing the second list among the at least one terminal, and wherein the transmitting the information may include transmitting information on the same item between the first list and the second list to each of the first terminal and the second terminal.

According to an embodiment of the present disclosure, the searching for the list may further comprise searching for, when failing to detect the second list, a third list including the same item as the at least one item of the first list, in which the number of the same item is a reference number or higher among the received at least one list and mediating the first terminal and a third terminal providing the third list. Further, the transmitting the information may further comprise transmitting information on the same item between the first list and the third list to each of the first terminal and the third terminal.

According to an embodiment of the present disclosure, the searching for the list may include searching for a second list including the same item as at least one among the at least one item, which is included in the first list among the received at least one list and mediating, when detecting the second list, the first terminal and a second terminal providing the second list. Further, the transmitting the information may include transmitting information on the same item between the first list and the second list to each of the first terminal and the second terminal.

According to an embodiment of the present disclosure, the searching for the list may further comprise searching for, when failing to detect the second list, a third list including an item fallen in the same category as that of the at least one among the at least one item of the first list among the received at least one list and mediating the first terminal and a third terminal providing the third list. Further, the transmitting the information may further comprise transmitting information on the category to each of the first terminal and the third terminal.

According to an embodiment of the present disclosure, a non-transitory computer-readable recording medium having recorded thereon a program for executing one mediating method as described above.

According to an embodiment of the present disclosure, a mediating device may comprise an input/output interface configured to receive a first list including at least one item from a first terminal and to receive at least one list from at least one terminal different from the first terminal, a controller configured to search a second list including an item corresponding to a first-ranked item among the at least one item included in the first list among the received at least one list, to mediate between the first terminal and a second terminal providing the second list to perform a first video communication according a result of the search, to calculate a first satisfaction level of a user of the first terminal during the first video communication, to search for, after the first video communication is finished, a third list including an item corresponding to a second-ranked item among the at least one item included in the first list among the received at least one list, to mediate between the first terminal and a third terminal providing the third list to perform a second video communication according a result of the search, to calculate a second satisfaction level of a user of the first terminal during the second video communication, to compare the first satisfaction level and the second satisfaction level, and to adjust the priority rank of the first-ranked item and the second-ranked item according to the result of the comparison, and a memory configured to store the first list through the third list.

According to an embodiment of the present disclosure, the controller may adjust the second-ranked item of the first list to a new first-ranked item and adjust the first-ranked item to a new second-ranked item when the second satisfaction level is higher than the first satisfaction level.

According to an embodiment of the present disclosure, the first satisfaction level may be calculated based on duration of the first video communication, and the second satisfaction level may be calculated based on duration of the second video communication.

Advantageous Effects

One or more embodiments may provide a mediating method and device, which are capable of efficiently mediating a plurality of terminals with one another Further, one or more embodiments may provide a mediating method and device, which are capable of mediating an appropriate user among users of a plurality of terminals to match with a user of another terminal Further, one or more embodiments may provide a mediating method and device, which are capable of allowing each user of a plurality of terminals to expand her or his interpersonal relationship through a mediation service.

DESCRIPTION OF DRAWINGS

FIG. 7 is a reference view illustrating a plurality of lists stored in a mediating device according to an embodiment of the present disclosure.

FIG. 11 is a reference view illustrating a list including the same item as one on a first list, in which the number of the same item is a reference number or higher, according to an embodiment of the present disclosure.

FIG. 12 is a reference view illustrating a list including the same item as one on a first list, in which the number of the same item is a reference number or higher, according to another embodiment of the present disclosure.

FIG. 14 is a reference view illustrating a list including the same item as at least one item on a first list according to an embodiment of the present disclosure.

MODE FOR INVENTION

Advantages and features of the present disclosure and a method of achieving the same will be more clearly understood from embodiments described below in detail with reference to the accompanying drawings. However, the present disclosure is not limited to the following embodiments and may be implemented in various different forms. The embodiments are provided merely to complete the present disclosure and to provide those of ordinary skill in the art with the category of the present disclosure. The present disclosure is defined only by the claims. Wherever possible, the same reference numbers will be used throughout the specification to refer to the same or like components.

It will be understood that although the terms "first," "second," etc. may be used to describe various components, these components should not be limited by these terms. These terms may be only used to distinguish one component from another. Therefore, a first component used herein may be a second component within the technical scope of the present disclosure.

The terminology used herein is for the purpose of describing embodiments and is not intended to limit the present disclosure. As used herein, the singular forms are intended to include the plural forms as well, unless the context clearly indicates otherwise. It will be further understood that the terms "comprises" or "comprising" used in this specification may denote that the used components or steps do not preclude the presence or addition of one or more other components and/or steps.

Unless otherwise defined, all terms used herein have the same meaning as commonly understood by those of ordinary skill in the art. It will be further understood that terms, such as those defined in commonly used dictionaries, will not be interpreted in an idealized or overly formal sense unless expressly so defined herein.

Figure 1:
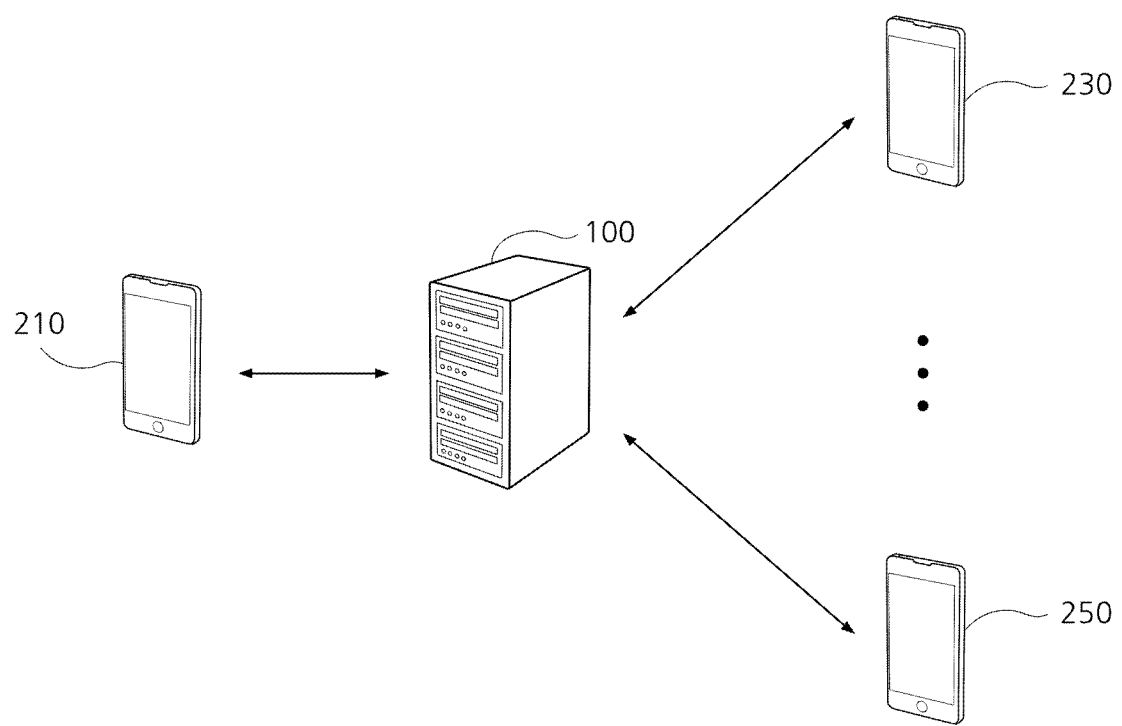
FIG. 1 is a network configuration diagram illustrating an environment of a mediating system in which a mediating device according to an embodiment of the present disclosure operates.

FIG. 1 is a network configuration diagram illustrating an environment of a mediating system in which a mediating device according to an embodiment of the present disclosure operates. Referring to FIG. 1, the environment of the mediating system may include a mediating device 100 and a plurality of terminals 210 to 250.

The mediating device 100 may be a server connecting the plurality of terminals 210 to 250 with one another. The mediating device 100 may provide a mediating service to transmit and receive data between the plurality of terminals 210 to 250. The mediating device 100 and the plurality of terminals 210 to 250 may be connected to a communication network. The mediating device 100 may transmit data or receive data to a plurality of terminals 210 to 250 through the communication network.

The communication network may be implemented as one of a wired communication network, a wireless communication network, and a hybrid communication network. For example, the communication network may include a mobile communication network such as 3G, Long Term Evolution (LTE), or LTE-A. The communication network may include a wired or wireless communication network such as Wi-Fi, Universal Mobile Telephone System/General Packet Radio Service (UMTS/GPRS), or Ethernet. The communication network may include a short-range communication network such as Magnetic Secure Transmission (MST), Radio Frequency Identification (RFID), Near Field Communication (NFC), ZigBee, Z-Wave, Bluetooth, Bluetooth Low Energy (BLE), or InfraRed (IR) communication. The communication network may include Local Area Network (LAN), Metropolitan Area Network (MAN), or Wide Area Network (WAN).

The mediating device 100 may receive a list from each of the plurality of terminals 210, 230, and 250. For example, the first list received from the first terminal 210 may include at least item corresponding to at least one from gender information, private area information, school information, hobby information, specialty information, interest information, or religion information of the user of the first terminal 210. The mediating device 100 may receive a list including an item similar to or same as at least one item included in the first list from at least one terminal 230 and 250 except for the first terminal 210.

The mediating device 100 may mediate at least two of the plurality of terminals 210, 230, and 250 to be connected to each other. For example, the mediating device 100 may receive a mediation request from the first terminal 210 and a first list of a user of the first terminal 210. The mediating device 100 may select a terminal to be mediated with the first terminal 210 among the at least one terminal 230 and 250 excluding the first terminal 210 in response to the mediation request.

For example, the mediating device 100 may select the second terminal 230 in response to the mediation request of the first terminal 210. The mediating device 100 may mediate between the first terminal 210 and the second terminal 230. The mediating device 100 may search for at least one of the same item between the first list provided by the first terminal 210 and a second list provided by the second terminal 230.

The at least one same item may refer to an item commonly included in the first list and the second list. For example, when each of the first list and the second list includes an item called "exercise," the "exercise" may be on the same item. When there is the same item between the first list and the second list, the mediating device 100 may transmit information about the same item between the first list and the second list to each of the first terminal 210 and the second terminal 230.

Further, the mediating device 100 may select a terminal of another user to be mediated by a user of the first terminal 210 based on the at least one item included in the first list. For example, the mediating device 100 may a terminal providing a list including the same item, in which the number of the same item is a reference number or higher, as at least one item included in the first list, a terminal providing a list including the same priority-assigned at least one item as the priority-assigned at least one item included in the first list, or a terminal providing a list including the same item as a specific item designated by the mediating device and included in the first list.

Further, the mediating device 100 may select a terminal providing a list including an item corresponding to at least one among the at least one item included in the first list. For example, the corresponded item may be an item fallen in the same category as that of at least one among the at least one item included in the first list or an item including a keyword similar to that of at least one among the at least one item included in the first list. For example, when the item of "music appreciation" is included in the first list, the item of "playing a musical instrument," "singing," or "composition" may be determined as an item including a similar keyword.

For example, the mediating device 100 may select the second terminal 230. The mediating device 100 may mediate between the first terminal 210 and the second terminal 230. The mediating device 100 may transmit information on the same item between the first list and the second list to each of the first terminal 210 and the second terminal 230.

The first terminal 210 and the second terminal 230 may be mediated with each other using the information received from the mediating device 100. The first terminal 210 and the second terminal 230, which are mediated with each other, may transmit or receive at least one of a message, a file, an image, and a video. Further, the first terminal 210 and the second terminal 230, which are mediated with each other, may make a call or a video call with each other. The first terminal 210 and the second terminal 230 may transmit or receive a message and the like via the mediating device 100 or without the mediating device 100. When the first terminal 210 and the second terminal 230 are mediated, each of the first terminal 210 and the second terminal 230 receives information about the same item from the mediating device 100. Each of the first terminal 210 and the second terminal 230 may display information on the same item in the form of text or image.

The plurality of terminals 210, 230, and 250 may be connected to a communication network. The plurality of terminals 210, 230, and 250 may be connected to another external device through a communication network. The plurality of terminals 210, 230, and 250 may be connected to the mediating device 100 through a communication network. The plurality of terminals 210, 230, and 250 may transmit data to the mediating device 100 or receive data from the mediating device 100.

Each of the plurality of terminals 210, 230, and 250 may be implemented as at least one of a desktop computer, a laptop computer, a smartphone, a smart tablet, a smartwatch, a mobile terminal, a digital camera, a wearable device, or a portable electronic device. The at least one terminal 210, 230, and 250 may execute programs or applications. Although only three terminals 210, 230, and 250 are illustrated in FIG. 1, the terminal may be implemented in a variety of numbers.

Respective users of the plurality of terminals 210, 230, and 250 may already be acquainted with each other or may not be acquainted with each other. For example, the respective users of the plurality of terminals 210, 230, and 250 may be mediated with each other through the mediating device 100 without knowing each other. Accordingly, users of the plurality of terminals 210, 230, and 250 may communicate with the other party, in which they do not know each other, through the mediation by the mediating device 100 to expand the interpersonal relationship of users.

Figure 2:
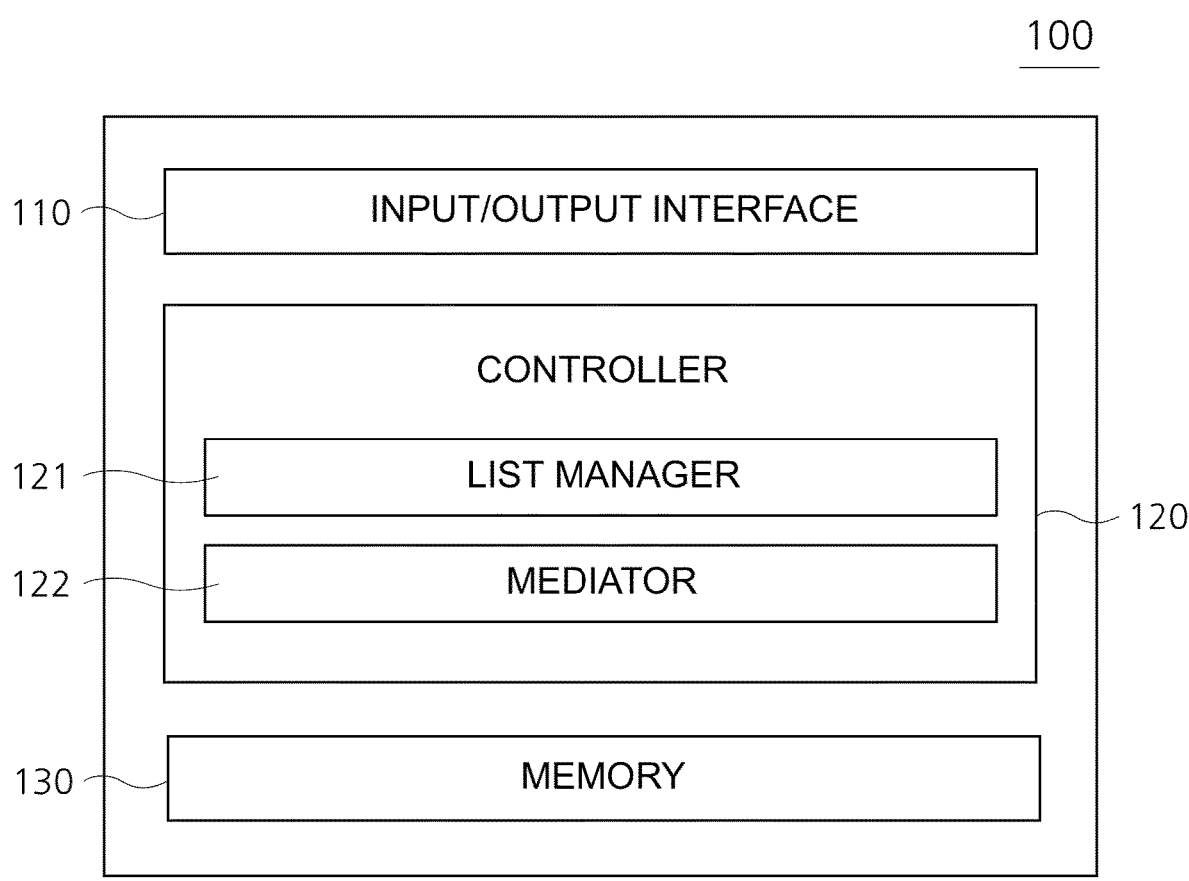
FIG. 2 is a block diagram illustrating a configuration of a mediating device according to an embodiment of the present disclosure.

FIG. 2 is a block diagram illustrating a configuration of a mediating device according to an embodiment of the present disclosure. Referring to FIGS. 1 and 2, the mediating device may comprise an input/output interface 110, a controller 120, and a memory 130.

The input/output interface 110 may transmit data to the outside of the mediating device 100 or may receive data from the outside of the mediating device 100. More specifically, the input/output interface 110 may transmit data to a plurality of terminals 210, 230, and 250 or may receive data from a plurality of terminals 210, 230, and 250. The input/output interface 110 may transmit the received data to at least one of the controller 120 and the memory 130. For example, the data may include information about each user of the plurality of terminals 210, 230, and 250.

For example, the input/output interface 110 may include a long-range network interface such as a 3G module, an LTE module, an LTE-A module, a Wi-Fi module, a WiGig module, an Ultra Wide Band (UWB) module, or a LAN card. Further, the input/output interface 110 may include, for example, a short-range network interface such as an Magnetic Secure Transmission (MST) module, a Bluetooth module, a Near Field Communication (NFC) module, a Radio Frequency Identification (RFID) module, a ZigBee module, a Z-Wave module, or an InfraRed (IR) module. Further, the input/output interface 110 may include other network interfaces.

The controller 120 may control the overall operation of the mediating device 100. For example, the controller 120 may control the operation of the input/output interface 110 and the memory 130. The controller 120 may include a list manager 121, and a mediation interface 122. The controller 120 may be configured to be implemented as a hardware circuit or may be configured to execute instruction codes of software.

The list manager 121 may manage a list received from each user of the plurality of terminals 210, 230, and 250. The list manager 121 may store the list received from the input/output interface 110 in the memory 130. For example, the list manager 121 may store and manage the list received for each terminal in the memory 130. The list manager 121 may retrieve the list stored in the memory 130 and output the list through the input/output interface 110.

The mediation interface 122 may mediate between at least two of the plurality of terminals 210, 230, and 250. For example, when the mediating device 100 receives the mediation request from the first terminal 210, the mediating device 100 may select the second terminal 230 in response to the mediation request of the first terminal 210. The mediating device 100 may mediate between the first terminal 210 and the second terminal 230. Further, the mediating device 100 may search for the same item between the first list provided by the first terminal 210 and the second list provided by the second terminal 230. The mediating device 100 may transmit information on the same item on the first list and the second list to each of the first terminal 210 and the second terminal 230.

Further, the mediation interface 122 may select a terminal to be mediated with the first terminal 210 based on a matching algorithm. The mediation interface 122 may select a terminal providing a list including the same item, in which the number of the same item is a reference number or higher, as at least one item included in the first list, a terminal providing a list including the same item as the priority-assigned at least one item included in the first list, or a terminal providing a list including the same item as a specific item designated by the mediating device and included in the first list base on the matching algorithm.

Further, the mediator 122 may select a terminal providing a list including an item corresponding to at least one among the at least one item included in the first list. For example, the corresponded item may be an item fallen in the same category as that of at least one among the at least one item included in the first list or an item including a keyword similar to that of at least one among the at least one item included in the first list.

For example, the mediating device 100 may select the second terminal 230 as a terminal to be matched with the first terminal 210. The mediating device 100 may mediate between the first terminal 210 and the second terminal 230.

The mediating device 100 may provide each of the first terminal 210 and the second terminal 230 with information on the same item on the first list and the second list.

The memory 130 may store a list received from at least one of the input/output interface 110 or the controller 120. Further, the memory 130 may provide the stored list to at least one of the input/output interface 110 or the controller 120. For example, the memory 130 may store a list corresponding to each of the plurality of terminals 210, 230, and 250. Further, information on a category of at least one item included in the list received from each of the plurality of terminals 210, 230, and 250 may be included.

The memory 130 may be implemented using a nonvolatile memory. For example, the nonvolatile memory may be implemented using one among flash memory, read-only memory (ROM), random access memory (RAM), electrically erasable read-only memory (EEROM), erasable programmable read-only memory (EPROM), electrically erasable and programmable read-only memory (EEPROM), and hard disk drive (HDD). Further, the memory 130 may further include volatile memory such as dynamic random access memory (DRAM) and static random access memory (SRAM). Further, the memory 130 may be managed using a database scheme.

Figure 3:
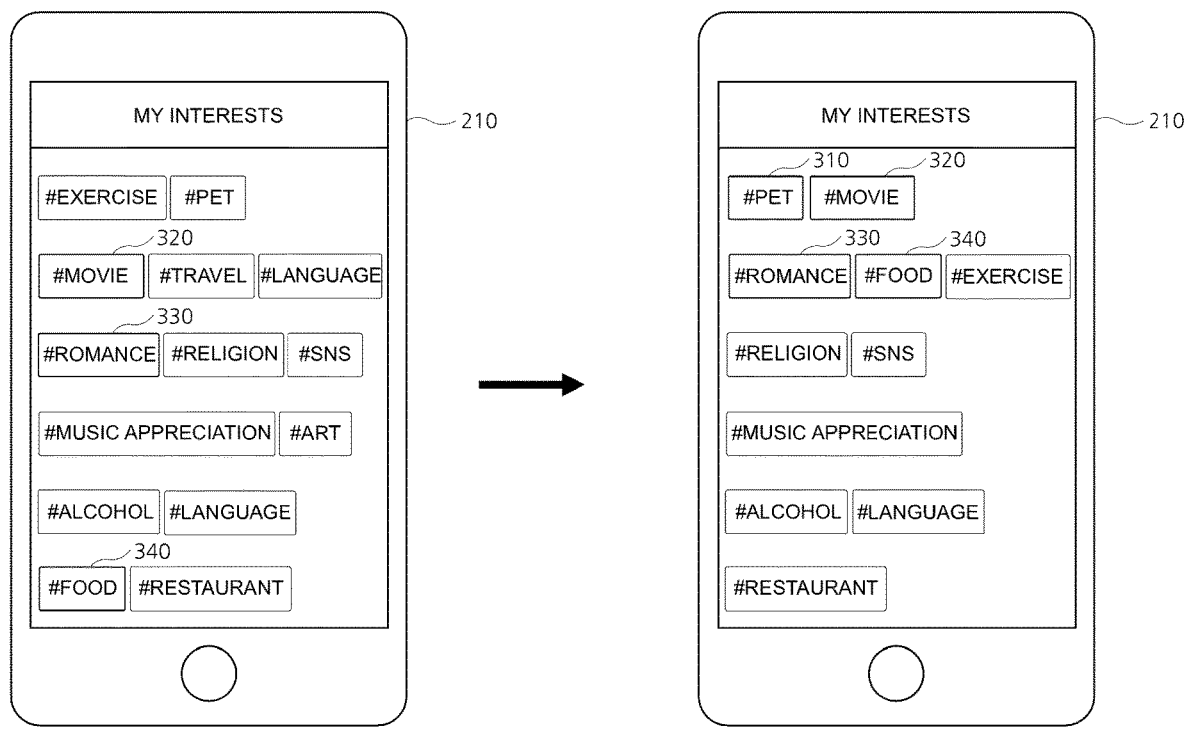
FIG. 3 is a block diagram illustrating a method of selecting a first list in a first terminal according to an embodiment of the present disclosure.

FIG. 3 is a block diagram illustrating a method of selecting a first list at a first terminal according to an embodiment of the present disclosure. Referring to FIGS. 1 and 3, the first terminal 210 may display a plurality of items to obtain a list of information of a user. For example, the plurality of items may be illustrated in keywords such as "exercise," "pet," "movie," "travel," "language," "romance," "religion," "social networking service (SNS)," "music appreciation," "alcohol," "food," or "restaurant." The plurality of items illustrated in FIG. 3 are only one embodiment for a description of the present disclosure, and the plurality of items may be set to various keywords.

A user of the first terminal 210 may select at least one item among a plurality of items displayed on the first terminal 210. For example, the user of the first terminal 210 may select items such as "pet" 310, "movie" 320, "romance" 330, and "food" 340. The items such as "pet" 310, "movie" 320, "romance" 330, and "food" 340 may be the first list of the user of the first terminal 210.

When the user of the first terminal 210 selects at least one item among the plurality of items, the order of the plurality of items displayed on the first terminal 210 may be rearranged. The at least one item selected by the user of the first terminal 210 (e.g., "pet" 310, "movie" 320, "romance" 330, and "food" 340) may be arranged prior to non-selected items.

Figure 4:
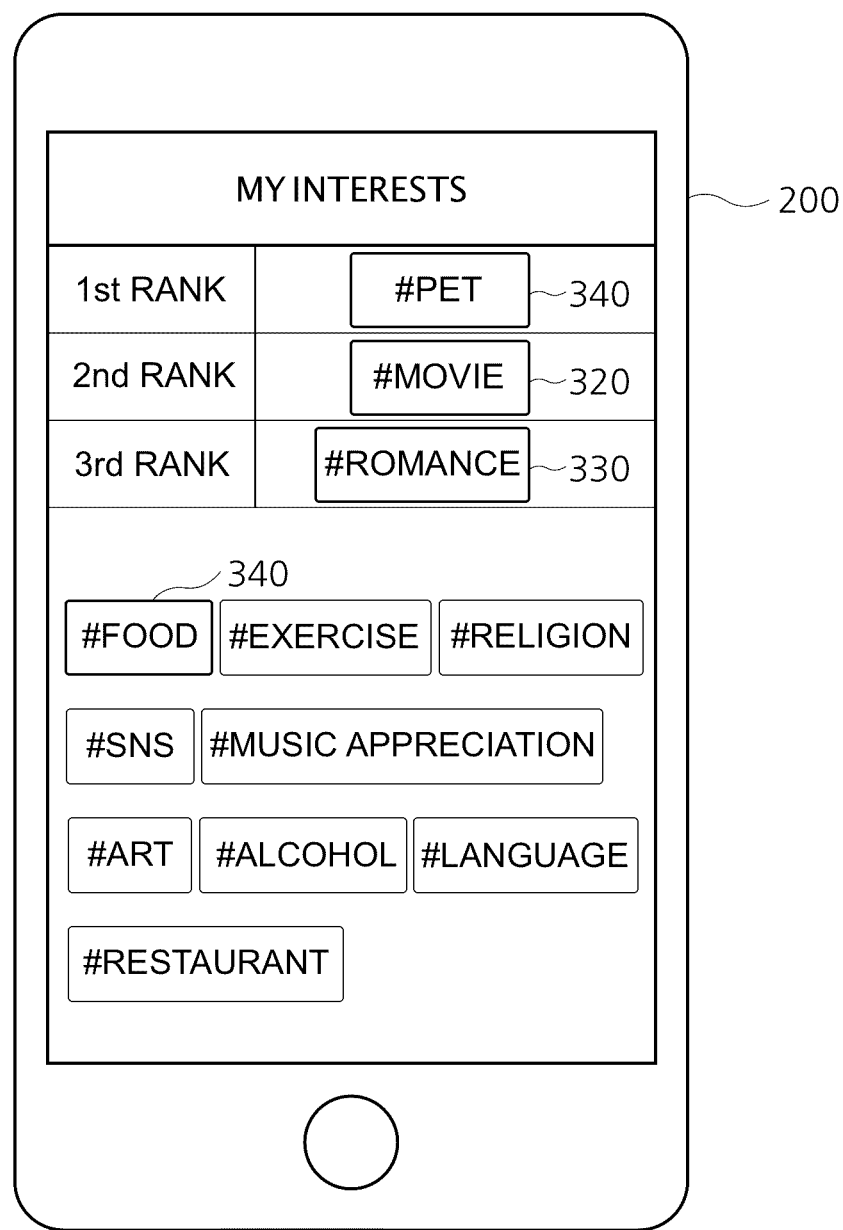
FIG. 4 is a block diagram illustrating a method of selecting a first list in a first terminal according to another embodiment of the present disclosure.

FIG. 4 is a block diagram illustrating a method for selecting the first list in the first terminal according to another embodiment of the present disclosure. Referring to FIGS. 1, 3, and 4, the user of the first terminal 210 may select at least one item among a plurality of items. In addition, the user of the first terminal 210 may determine the order by priority rank of the selected at least one item.

The order by priority rank of at least one item may be determined in various ways. For example, the order by priority rank of at least one item may be determined in the order selected by the user of the first terminal 210. First, when the user of the first terminal 210 selects the item of "pet" 310, the item of "pet" 310 may be the first-ranked item, and second, the item of "movie" 320 is selected, the item of "movie" 320 may be the second-ranked item. Third, when the item of "love" 330 is selected, the item of "love" 330 may be the third-ranked item.

As another example, the user of the first terminal 210 may drag a desired item to input it in each ranked position. For example, the plurality of items may be displayed on the first terminal 210. The user of the first terminal 210 may touch select a desired item among a plurality of items to select it and may drag the selected item to the first-ranked to third-ranked positions. The three ranks shown in FIG. 4 are only embodiments for a description of the order by priority rank, and the number of ranked positions may be implemented in various numbers.

Referring to FIG. 4, information on the priority rank assigned to the item may be displayed on an upper portion of the screen of the first terminal 210. Further, items selected other than one having the priority (e.g., the item of "food" 340) and unselected items may be displayed under the prioritized items. Further, items selected other than one having the priority (e.g., the item of "food" 340) may be preferentially arranged over the unselected items. The display configuration of the first terminal 210 shown in FIG. 4 is only one embodiment for a description of the present disclosure, the prioritized items, the selected non-prioritized items, and the unselected items may be displayed in various forms.

Figure 5:
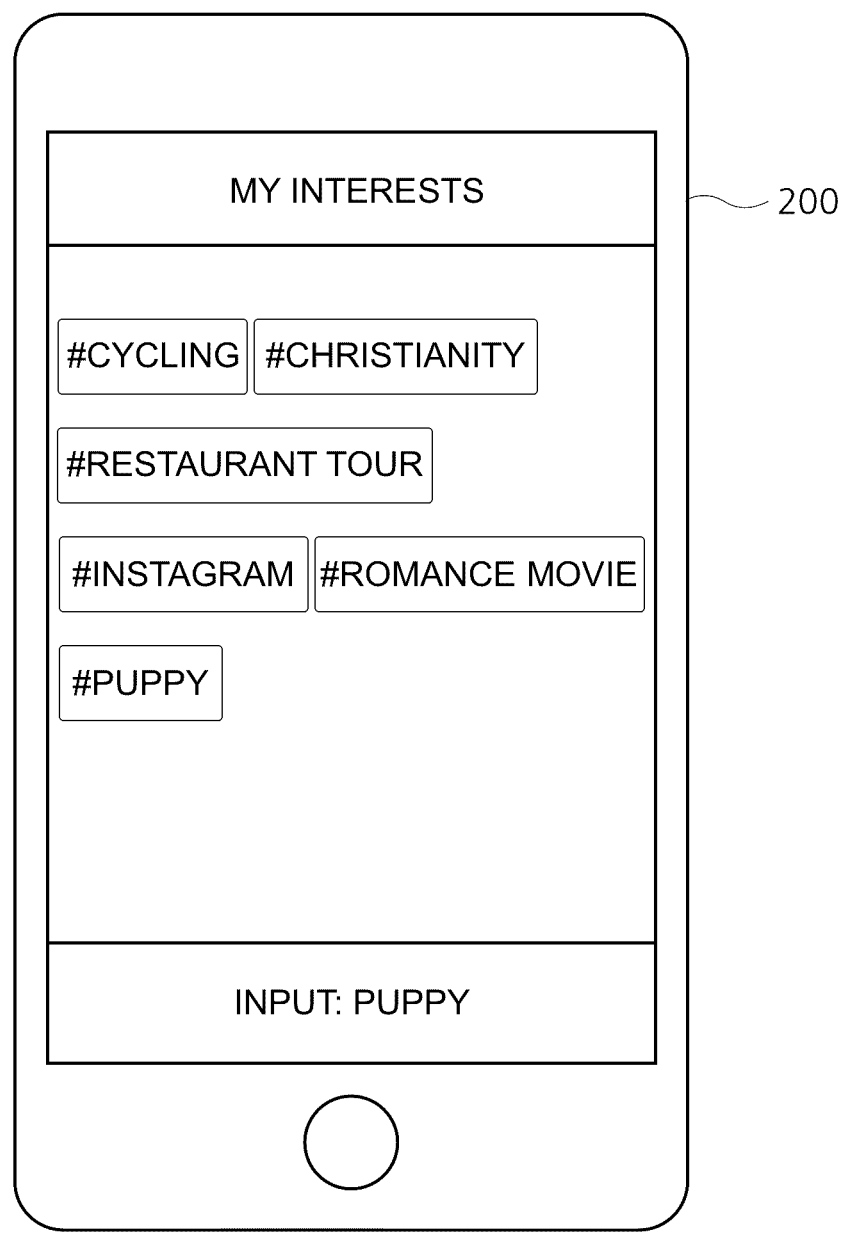
FIG. 5 is a block diagram illustrating a method of selecting a first list in a first terminal according to still another embodiment of the present disclosure.

FIG. 5 is a block diagram illustrating a method of selecting the first list in the first terminal according to still another embodiment of the present disclosure. Referring to FIGS. 1, and 3 to 5, the user of the first terminal 210 may directly input at least one item included in the first list. The at least one item input by the user of the first terminal 210 may be displayed as illustrated in FIG. 5.

The user of the first terminal 210 may input the at least one item through a speech recognition method or a touch recognition method. For example, the user of the first terminal 210 may input keywords, for example, "cycling," "Christianity," "restaurant tour," "Instagram," "romance movie," and "puppy" as an item. The items such as "cycling," "Christianity," "restaurant tour," "Instagram," "romance movie," and "puppy" may be in the first list of the users of the first terminal 210.

Further, the user of the first terminal 210 may determine the order by priority rank of the at least one item. For example, the priority rank of at least one item may be assigned in the order input by the user of the first terminal 210. Alternatively, the user of the first terminal 210 may input at least one item and assign the priority rank to at least one among the at least one item.

In the embodiment shown in FIGS. 3 and 4, the user of the first terminal 210 may select at least one item among a plurality of items specified. On the other hand, in the embodiment shown in FIG. 5, the user of the first terminal 210 may directly input at least one item. Therefore, in the embodiment shown in FIG. 5, the user of the first terminal 210 may input information including more various kinds of items.

Figure 6:
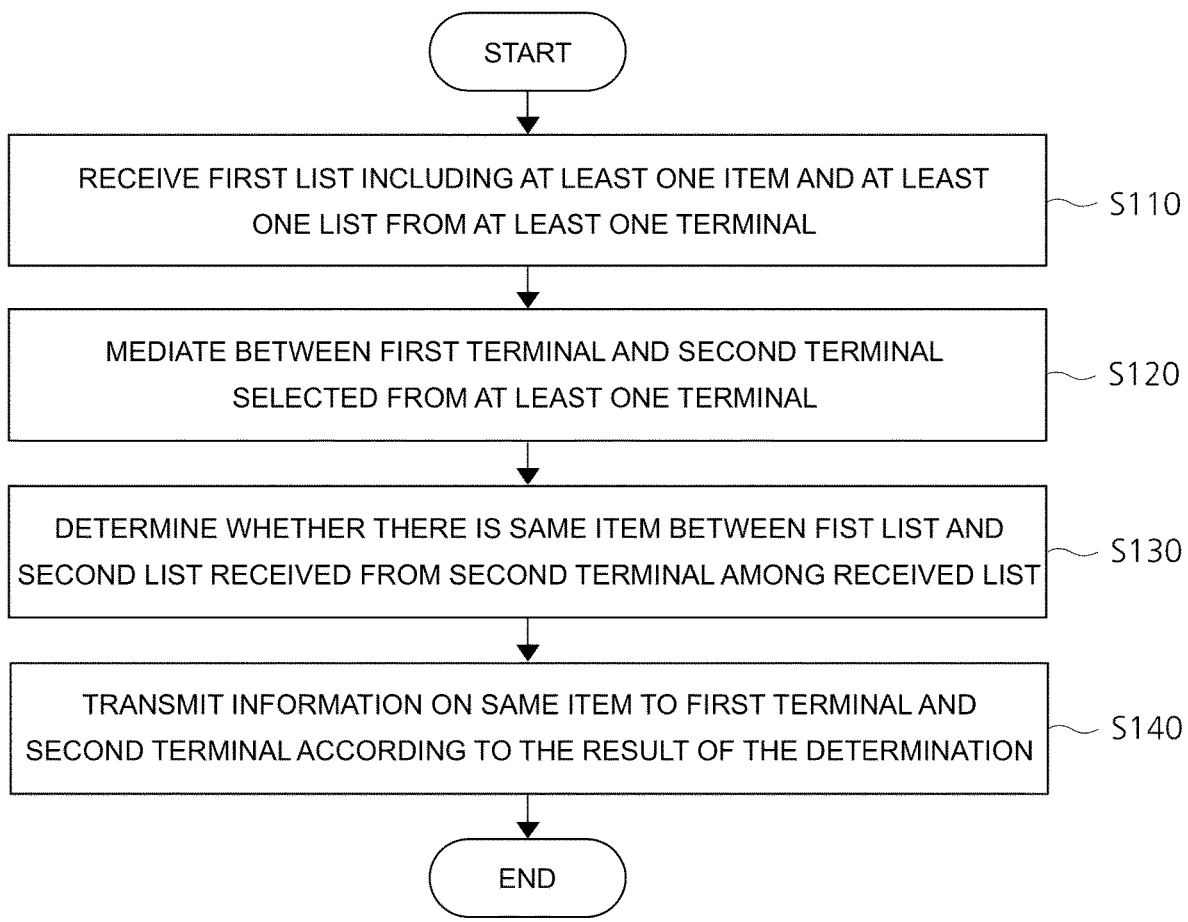
FIG. 6 is a flowchart illustrating a mediating method by a mediating device according to an embodiment of the present disclosure.

FIG. 6 is a flowchart illustrating a mediating method by a mediating device according to an embodiment of the present disclosure. Referring to FIGS. 1 to 6, in operation S110, the mediating device 100 may receive a first list from the first terminal 210 and may receive at least one list from at least one terminal 230 and 250 different from the first terminal. The first list may be produced as described with reference to FIGS. 3 to 5.

In operation S120, the mediating device 100 may provide a mediation service between the first terminal 210 and the second terminal 230 selected from the at least one terminal 230 and 250. For example, the second terminal 230 may be selected randomly. In operation S130, the mediating device 100 may determine whether there is the same item between the first list and the second list received from the second terminal 230 among the received at least one list. A method of determining whether there is the same item between the first list and the second list may be described with reference to FIG. 7.

FIG. 7 is a reference view illustrating a plurality of lists stored in a mediating device according to an embodiment of the present disclosure. Referring to FIGS. 3, 6, and 7, the memory 130 may store lists A to C. The lists A to C may be received from each of the remaining ones of the plurality of terminals 210, 230 and 250, except for the first terminal 210.

The list A may include items such as "pet," "SNS," "music," and "baseball." The list B may include items such as "SNS," "alcohol," "restaurant," and "exercise." The list C may include items such as "religion," "alcohol," "restaurant," "art," and "exercise." For example, the list A may be a second list received from second terminal 230. The first list and the list A commonly include the item of "pet." In such a case, the item of "pet" may be the same item. Therefore, the mediating device 100 may select the item of "pet" as the same item between the first list and the list A.

Referring again to FIG. 6, in operation S140, the mediating device 100 may transmit information on at least one the same item to each of the first terminal 210 and the second terminal 220 according to the result of the determination. For example, when it is determined that there is the same item between the first list and the second list, the mediating device 100 may transmit information on the same item to the first terminal 210. The method in which information on the same item is displayed on the first terminal will be described with reference to FIG. 8.

Figure 8:
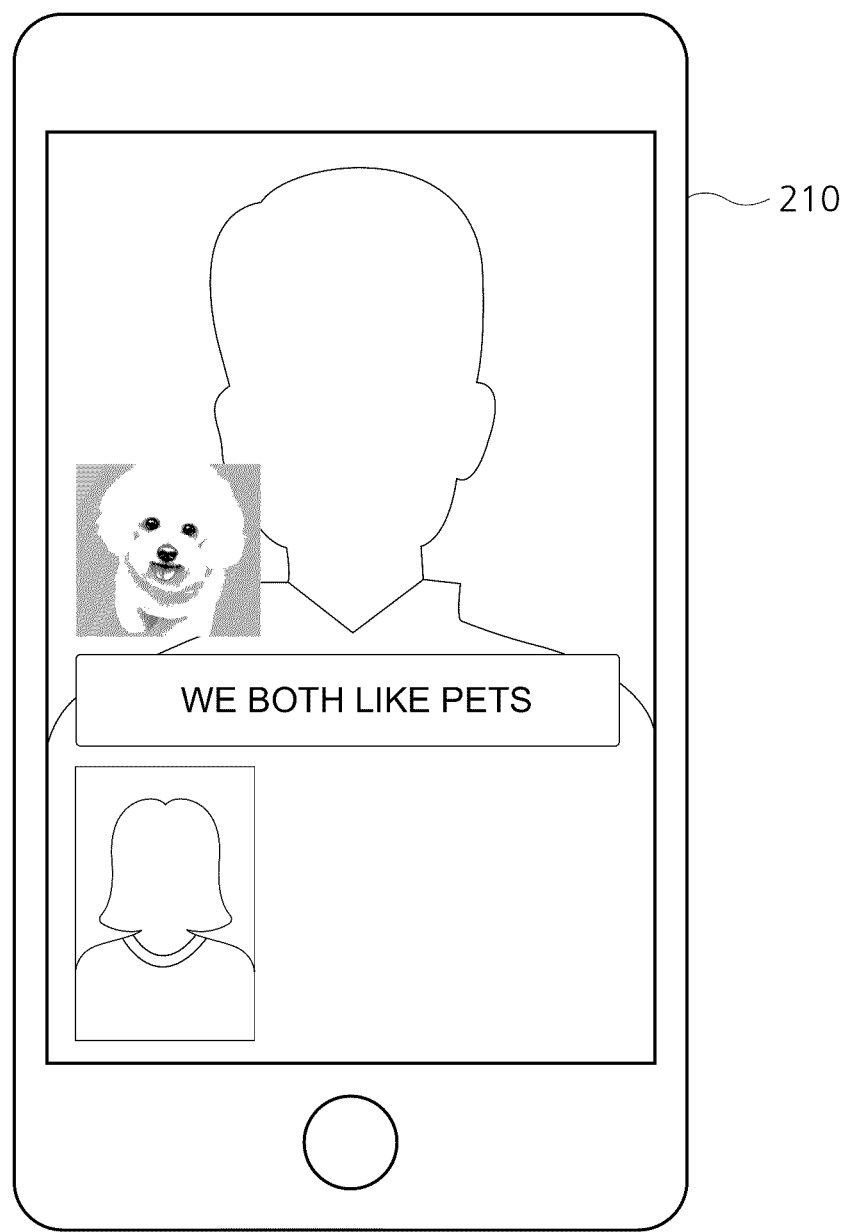
FIG. 8 is a reference view illustrating a method of displaying information on the same item by a first terminal according to an embodiment of the present disclosure.

FIG. 8 is a reference view illustrating a method of displaying information on the same item by the first terminal according to an embodiment of the present disclosure. Referring to FIG. 8, when the first terminal 210 is mediated to the second terminal 230 by the mediating service, users of the first terminal 210 and the second terminal 230 may make a video communication with each other.

When a video communication is performed between the first terminal 210 and the second terminal 230, information on the same item may be displayed on the screen of the first terminal 210. For example, when the same item is the item of "pet," the image and text of "pet" (for example, "WE BOTH LIKE PETS") may be displayed on the screen of the first terminal 210. Further, information on the same item may be provided to a video communication corresponded terminal (e.g., the second terminal 230) of the first terminal 210.

Figure 9:
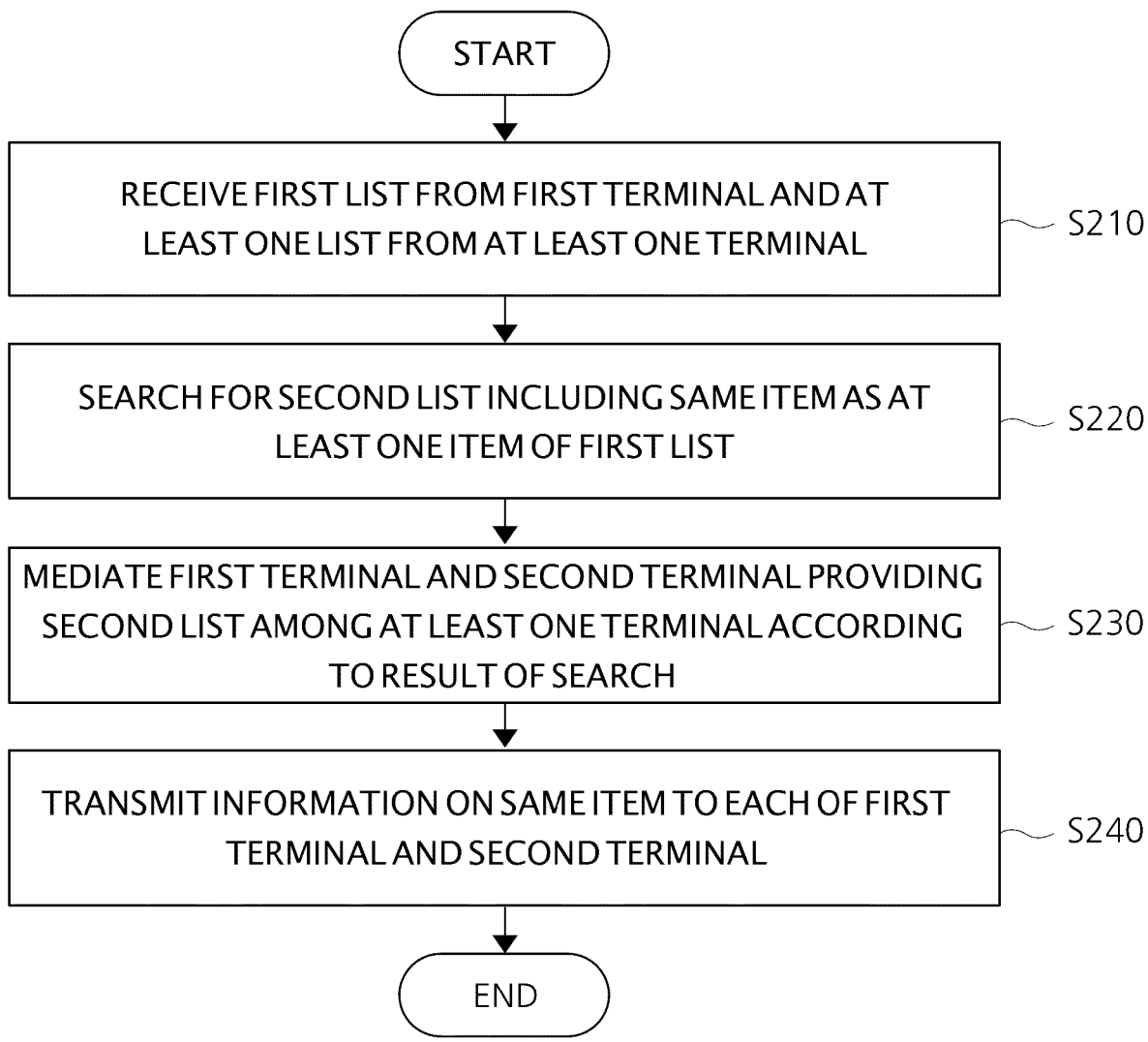
FIG. 9 is a flowchart illustrating a mediating method by a mediating device according to another embodiment of the present disclosure.

FIG. 9 is a flowchart illustrating a mediating method by the mediating device according to another embodiment of the present disclosure. Referring to FIGS. 1 to 5, 7, and 9, in operation S210, the mediating device 100 may receive the first list from the first terminal 210 and may receive at least one list from the at least one terminal 230 and 250 different from the first terminal 210. The first list may be produced in a similar or the same way as described with reference to FIGS. 3 to 5.

In operation S220, the mediating device 100 may search for a second list that includes the same item as at least one among the at least one item on the first list among the at least one item. For example, the mediating device 100 may search for a list including the same item as at least one item on the at least one list stored in the memory 130. The method by which the mediating device 100 searches for a list including the same item as one of the first list will be described with reference to FIG. 7.

Referring to FIGS. 3, 7, and 9, the memory 130 of the mediating device 100 may store information received from each of the plurality of terminals 210, 230, and 250. For example, the first list received by the mediating device 100 may include items such as "pet," "movie," "romance," and "food."

The mediating device 100 may search for a list including the same item as one of the first list among the lists A to C stored in the memory 130. The first list and the list A commonly include the item of "pet." Therefore, the mediating device 100 may select the item of "pet" as the same item between the first list and the list A. For example, the list A may be the same as the second list received from second terminal 230.

Referring again to FIG. 9, in operation S230, the mediating device 100 may mediate the first terminal 210 and the second terminal 230 which provides the second list among the at least one terminal 230 and 250 according to the searching result. Further, in operation S240, the mediating device 100 may transmit information on the same item to each of the first terminal 210 and the second terminal 230. The first terminal 210 may display information on the same item in similar or the same as the method shown in FIG. 8.

Figure 10:
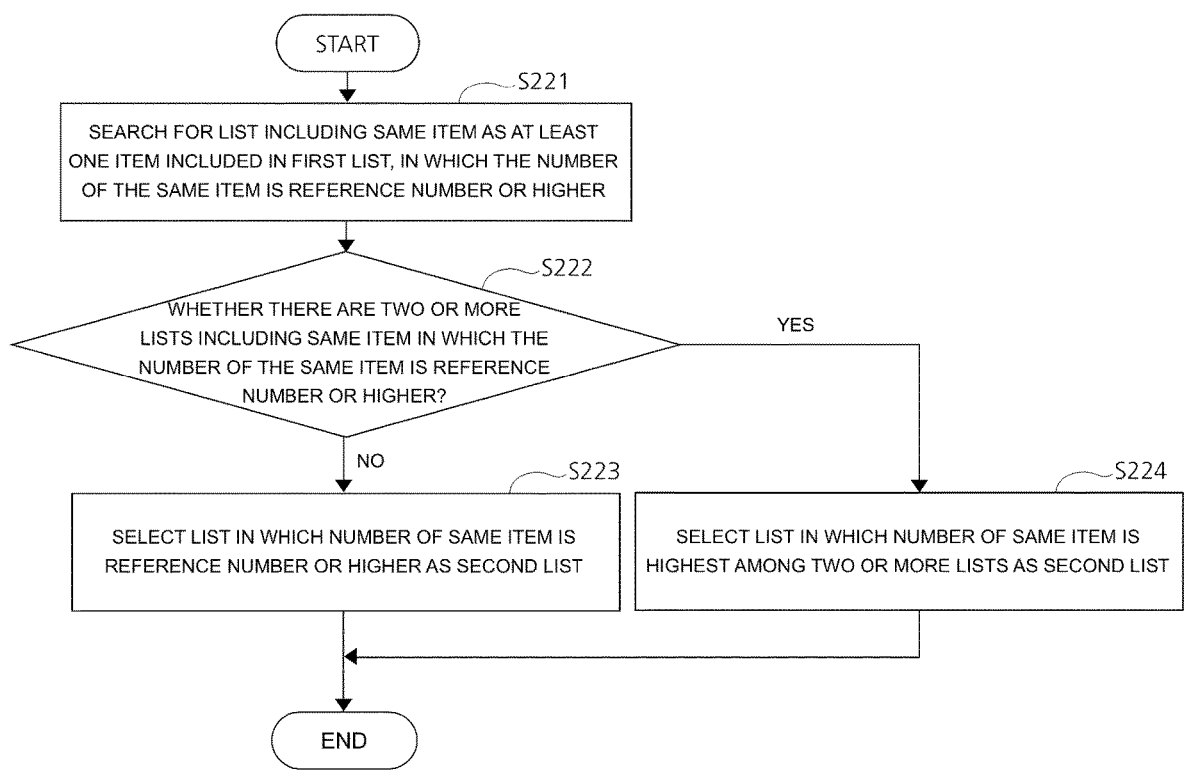
FIG. 10 is a flowchart illustrating a method of searching for a terminal which provides a list including the same item as one on a first list, in which the number of the same item is a reference number or higher, according to an embodiment of the present disclosure.

FIG. 10 is a flowchart illustrating a method of searching for a terminal which provides a list including the same item as one of a first list, in which the number of the same item is a reference number or higher, according to an embodiment of the present disclosure. Referring to FIGS. 2, 6, and 10, in operation S221, the mediating device 100 may search for a list including the same item as at least one item included in the first list, in which the number of the same item is a reference number or higher. For example, the reference number may be three. This is only one embodiment for a description of the present disclosure, and the reference number may be set variously.

In operation S222, the mediating device 100 may determine whether there are two or more lists in which the number of the lists is a reference number or higher. For example, when there is one list in which the number of the same item is a reference number or higher, in operation S223, the mediating device 100 may select the one list in which the number of the same item is a reference number or higher as the second list. This may be described with reference to FIG. 11

FIG. 11 is a reference view illustrating a list including the same item as one of a first list, in which the number of the same item is a reference number or higher, according to an embodiment of the present disclosure. Referring to FIGS. 2 and 11, the memory 130 may store lists D to F. The lists D to F may be received from each of the remaining ones of the plurality of terminals 210, 230 and 250, except for the first terminal 210. Further, referring to FIG. 3, the first list received from the first terminal 210 may include items such as "pet," "movie," "romance," and "food."

The list D may include items such as "pet," "movie," "SNS," and "food." The list E may include items such as "pet," "exercise," "food," and "baseball." The list F may include items such as "religion," "alcohol," "restaurant," "art," and "pet." The lists D to F are only embodiments for a description of the present disclosure, and the number of lists may be proportional to the number of the plurality of terminals 230 and 250. Further, at least one item included in each of the lists D to F may be set variously.

The same items between the first list and the list D may be the items of "pet," "movie," "love," and "food." The same items between the first list and the list E may be the items of "pet" and "food." Further, the same item between the first list and the list F may be "pet." In such a case, a list in which the number of the same item is reference number or higher (e.g., three) may be the list D. Accordingly, the mediating device 100 may select the list D.

When it is determined in operation S222 that the number of lists in which the number of the same item is a reference number or higher is two or more, in operation s224, the mediating device 100 may select a list in which the number of the same items is highest among the two or more lists. This may be described with reference to FIG. 12.

FIG. 12 is a reference view illustrating a list including the same item as one of the first list, in which the number of the same item is a reference number or more, according to another embodiment of the present disclosure. Referring to FIGS. 2 and 12, the memory 130 may store lists G to list I. The lists G to I may be received from each of the remaining ones of the plurality of terminals 210, 230 and 250, except for the first terminal 210. Further, referring to FIG. 3, the first list received from the first terminal 210 may include items such as "pet," "movie," "romance," and "food."

The list G may include items such as "pet," "movie," "SNS," and "food." The list H may include items such as "pet," "romance," "food," and "baseball." The list I may include items such as "religion," "alcohol," "restaurant," "art," and "pet." The lists G to I are only embodiments for a description of the present disclosure, and the number of lists may be proportional to the number of the plurality of terminals 230 and 250. Further, at least one item included in each of the lists G to I may be set variously.

The same items between the first list and the list G may be "pet," "movie," "romance," and "food." The same items between the first list and the list H may be "pet," "romance," and "food." Further, the same items between the first list and the list I may be "pet." In such a case, a list in which the number of the same item is reference number or higher (e.g., three) may be the lists G and H. Accordingly, the mediating device 100 may select the list H including the same item in which the number of the same item is highest among the lists G and H.

Figure 13:
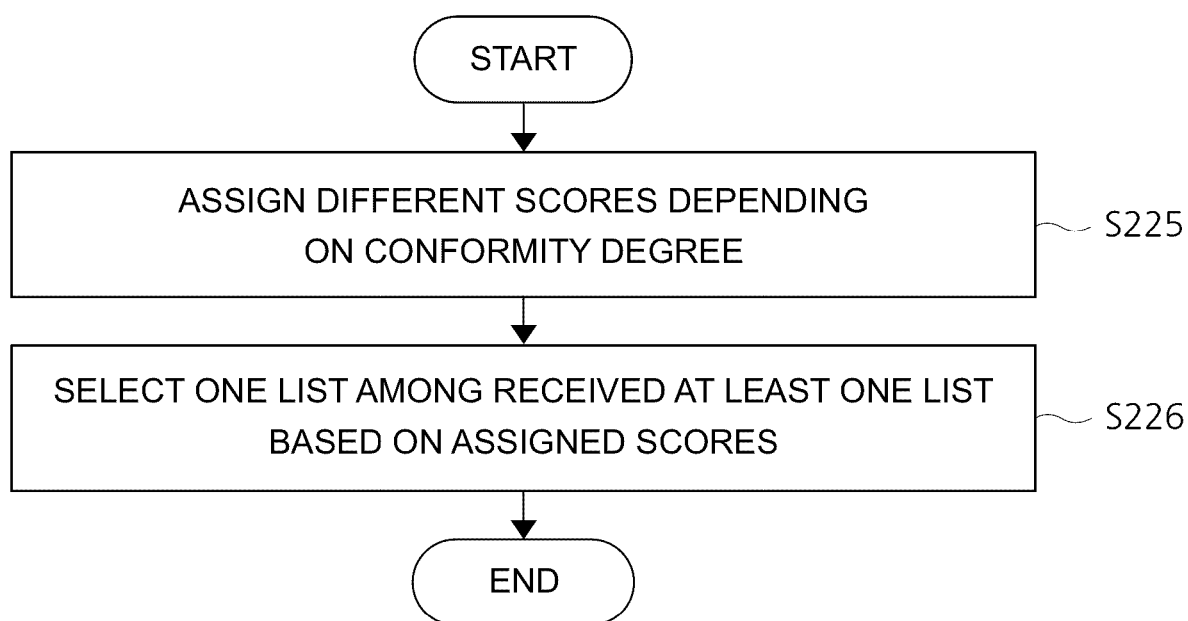
FIG. 13 is a flowchart illustrating a method of selecting a list based on scores assigned according to items ordered by priority rank according to an embodiment of the present disclosure.

FIG. 13 is a flowchart illustrating a method of selecting a list based on scores assigned according to items ordered by priority rank according to an embodiment of the present disclosure. Referring to FIGS. 6 and 13, in operation S225, the mediating device 100 may assign different scores from each other depending on the conformity degree between a priority rank-assigned item among the at least one item included in the first list and a priority rank-assigned item included in each of the at least one list. Referring to FIG. 4, the first-ranked item on the first list may be the item of "pet," the second-ranked item may be the item of "movie," and the third-ranked item may be the item of "romance."

The mediating device 100 may assign different scores to items corresponding to respective ranks. For example, the mediating device 100 may assign "100" to the first-ranked item (e.g., "pet") "70" to the second-ranked item (e.g., "movie"), and "30" to the third-ranked item (e.g., "romance"). In such a case, the sum of the scores of the first list may be "200." In operation S236, the mediating device 100 may calculate the sum of the scores of the prioritized items included in the respective lists received based on the sum of the lists (e.g., "200"). The method of calculating the scores may be described with reference to FIG. 14.

FIG. 14 is a reference view illustrating a list including the same items as at least one item on the first list according to an embodiment of the present disclosure. Referring to FIGS. 2 and 14, the memory 130 may store the lists J to L. The lists J to L may be received from each of the remaining ones of the plurality of terminals 210, 230 and 250, except for the first terminal 210. Referring to FIG. 3, the first list received from the first terminal 210 may include items such as "pet," "movie," "romance," and "food."

When the priority rank-assigned item on each of the lists J to L includes the same item as the priority rank-assigned item on the first list, the mediating device 100 may assign a score to the same item. For example, the first ranked item of the list J may be the item of "movie," the second-ranked item may be the item of "love," and the third-ranked item may be the item of "religion." In such a case, the first ranked item (e.g., "movie") and the second-ranked item (e.g., "romance"), respectively, may be the same as the second-ranked item (e.g., "movie") and the first-ranked item (e.g., "romance) on the first list. Therefore, the mediating device 100 may assign a score to each of the first-ranked item (e.g., "movie") and the second-ranked item (e.g., "romance") on the list J. For example, the mediating device 100 may assign "80" to the first ranked item (e.g., "movie") of the list H, and assign "40" to the second-ranked item (e.g., "romance"). The sum of the scores of the list H may be "120."

When the same item on the list J as the priority rank-assigned item on the first list is higher in priority than that on the first list, the mediating device 100 may assign a score higher than the score given in the first list to the same item. On the other hand, when the same item on the list J as the priority rank-assigned item on the first list is lower in priority than that on the first list, the mediating device 100 may assign a score lower than the score given in the first list to the same item. This is only one embodiment for a description of the present disclosure, and the score may be calculated based on various calculation methods.

The first-ranked item on the list K may be "pet," the second-ranked item may be "movie," and the third-ranked item may be "romance." In such a case, the first-ranked item (e.g., "pet") and the second-ranked item (e.g., "movie") on the list K, respectively, are the same as the first-ranked item (e.g., "pet") and the second-ranked item (e.g., "movie") on the first list. Thus, the mediating device 100 may assign a score to each of the first-ranked item (e.g., "pet") and second-ranked item (e.g., "movies") on the list K. The same priority rank-assigned items between the list K and the first list may be given the same priority rank as each other. Accordingly, the first-ranked item and the second-ranked item on the list K, respectively, may be assigned scores which are the same as ones which the mediating device 100 assigns to the first-ranked item and the second-ranked item on the first list. The mediating device 100 may assign "100" to the first-ranked item (e.g., "pet") on the list K and may assign "70" to the second-ranked item (e.g., "movie") on the list K. The sum of the scores of the list K may be "170."

Finally, the first-ranked of the list L may be "romance," the second-ranked item may be "pet," and the third-ranked item may be "restaurant." In such a case, the first-ranked item (e.g., "romance") and the second-ranked item (e.g., "pet") on the list L, respectively, are the same as the third-ranked item (e.g., "romance") and the first-ranked item (e.g., "pet"). The mediating device 100 may assign a score to each of the first-ranked item (e.g., "romance") and the second-ranked item (e.g., "pet") on the list L.

The first-ranked item on the list L (e.g., "romance") may be the same as the third-ranked item of the first list (e.g., "romance"). Accordingly, the mediating device 100 may assign "50" to the first-ranked item on the list L (e.g., "romance"), which is higher than the score (e.g., "30") assigned to the third-ranked item on the first list. The second-ranked item on the list L (e.g., "pet") may be the same as the first-ranked item of the first list (e.g., "pet"). Accordingly, the mediating device 100 may assign "90" to the second-ranked item on the list L (e.g., "pet"), which is lower than the score (e.g., "100") assigned to the first-ranked item on the first list. Further, the sum of the scores of the list L may be "140."

Thus, the sum of the scores of the list J may be "120," the sum of the scores of the list K may be "170," and the sum of the scores of the list L may be "140." The list with the highest sum of scores among list J to list L is list K. The mediating device 100 may determine that the list K has the highest level of correspondence with the first list.

Referring again to FIG. 13, in operation S226, the mediating device 100 may select, as the second list, a list among the received at least one list based on the assigned scores. The mediating device 100 may select the list K having the highest sum of the scores among the at least one list (e.g., the lists J to L) as the second list.

Figure 15:
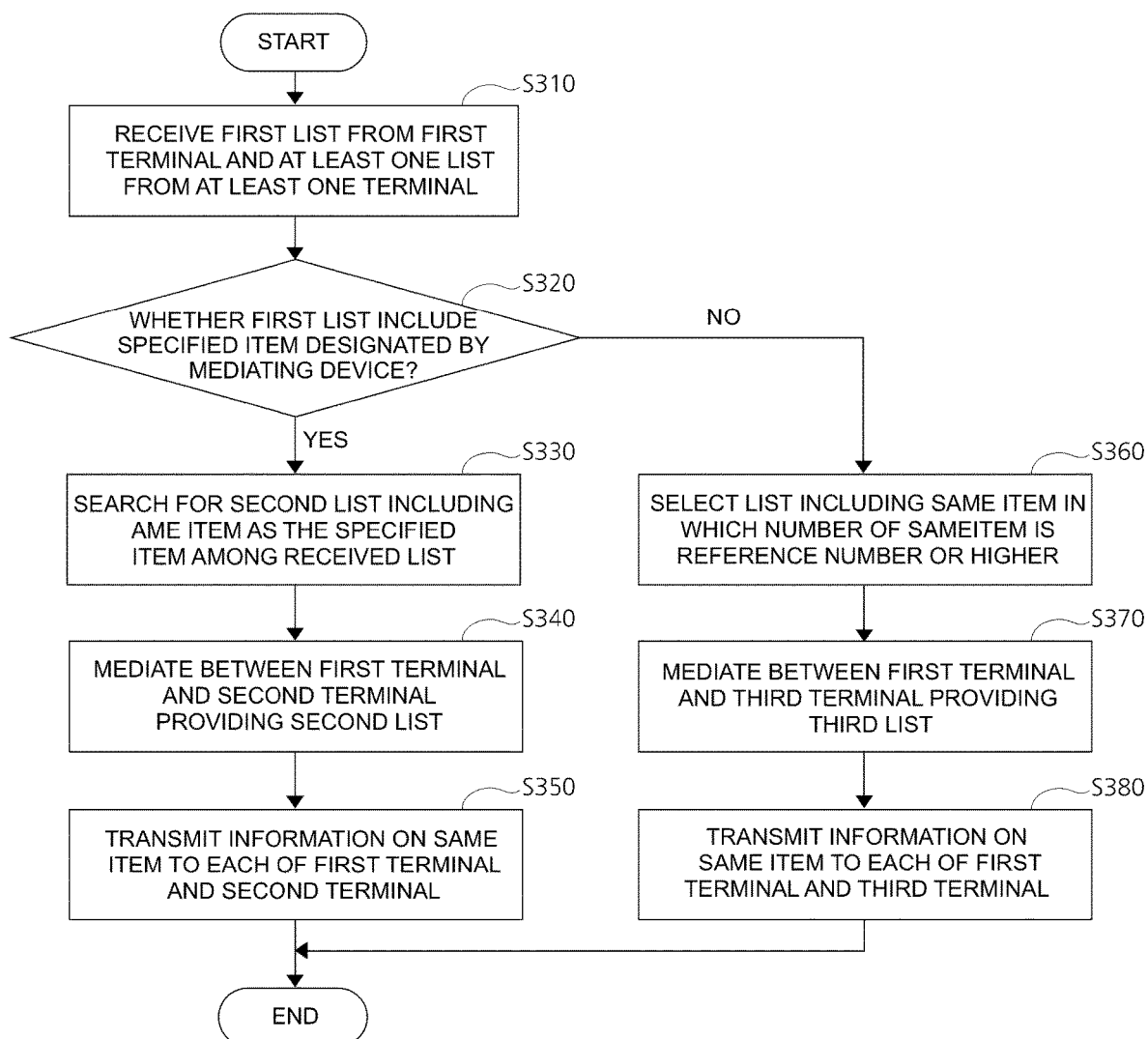
FIG. 15 is a flowchart illustrating a method of searching for a list including a specified item designated by a mediating device according to an embodiment of the present disclosure.

FIG. 15 is a flowchart illustrating a method of searching for a list including a specified item assigned by the mediating device according to an embodiment of the present disclosure. Referring to 2 and 15, in operation S310, the mediating device 100 may receive the first list from the first terminal 210 and may receive at least one list from at least one terminal 230 and 250 different from the first terminal 210 with each other.

In operation S320, the mediating device 100 may determine whether the first list includes the specified item designated by the mediating device 100.

The specified item may include specific keywords associated with at least one of a particular event, anniversary, event, or holiday. For example, a specified item in December may be "Christmas." A specified item in February 2018 may be the "Winter Olympics." The type of the specified item is not limited to the above-described keyword but can be set to various kinds.

When the first item is determined to include a specific item designated by the mediating device 100, the mediating device 100, in operation S330, may search for the second list including the same item as the specified item among the received at least one list. In operation S340, the mediating device 100 may mediate between the first terminal 210 and the second terminal providing the second list (e.g., the second terminal 230 illustrated in FIG. 1) among the at least one terminal 230 and 250. Further, in operation 350, the mediating device 100 may transmit information on the same item to each of the first terminal 210 and the second terminal 230.

When the first list is determined not to include the specified item designated by the mediating device 100 in operation S320, the mediating device 100 may select, as the third list, a list including the same item in which the number of the same item is a reference number or higher among the received at least one list in operation S360. In operation S370, the mediating device 100 may mediate between the first terminal and the third terminal providing the third list (e.g., the third terminal 250 illustrated in FIG. 1) among the at least one terminal. In operation S380, the mediating device 100 may transmit information on the same item to each of the first terminal 210 and the third terminal.

Figure 16:
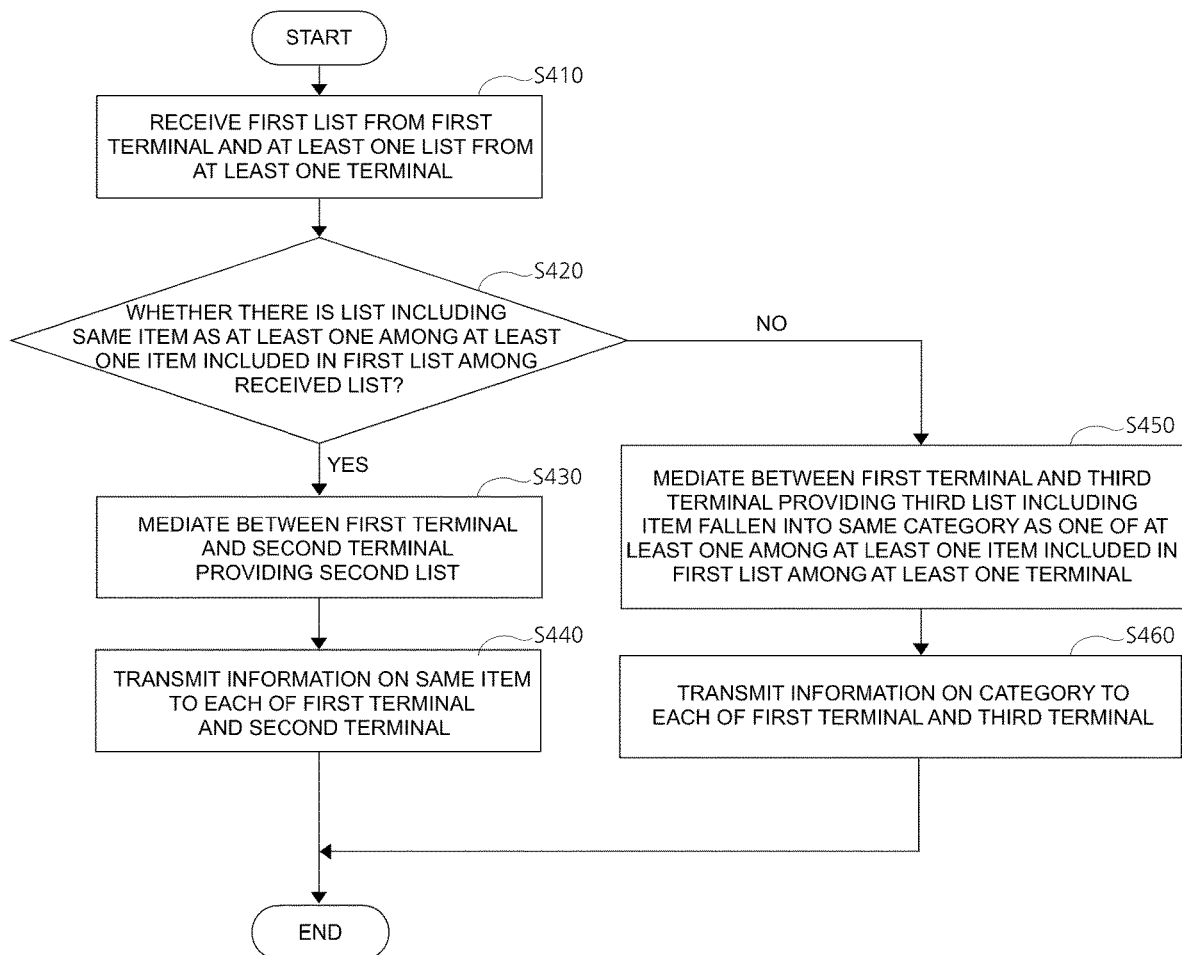
FIG. 16 is a flowchart illustrating a method of searching for a terminal providing a list including an item having the same category according to an embodiment of the present disclosure.

FIG. 16 is a flowchart illustrating a method of searching for a terminal providing a list including an item having the same category according to an embodiment of the present disclosure. Referring to FIGS. 2 and 16, in operation S410, the mediating device 100 may receive the first list from the first terminal 210 and may receive at least one list from the at least one terminal 230 and 250 different from the first terminal. For example, the at least one item included in the first list may be an item directly input by a user of the first terminal 210. In operation S420, the mediating device 100 may determine whether there is a list including the same item as at least one among the at least one item included in the first list among the received at least one list.

When there is a list including the same item as at least one among the at least one item included in the first list among the received at least one list, the mediating device 100, in operation S430, may mediate between the first terminal 210 and the second terminal 230 including the same item. Further, in operation S440, the mediating device 100 may transmit information on the same item to each of the first terminal 210 and the second terminal 230. In such a case, the first terminal 210 may display the information on the same item similarly to the method illustrated in FIG. 8.

When there is no list including the same item as the at least one among the at least one item included in the first list among the received at least one list, the mediating device 100, in operation S450, may mediate between the first terminal 210 and the third terminal 250 providing the third list including the item fallen into the same category as one of the at least one among the at least one item included in the first list among the at least one terminal 230 and 250. The category of the item can be described with reference to FIG. 17.

Figure 17:
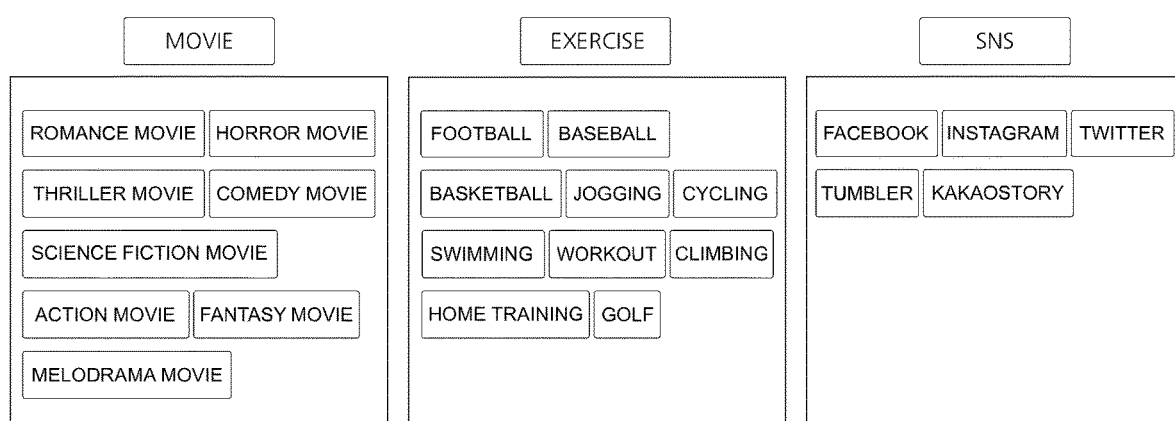
FIG. 17 is a reference view illustrating categories of items according to an embodiment of the present disclosure.

FIG. 17 is a reference view illustrating categories of items according to an embodiment of the present disclosure. Referring to FIG. 17, information on categories of a plurality of items may be stored in the memory 130. The category may be a superordinate concept to the plurality of items. For example, "movie" may be a category of various items such as "romance movie," "horror movie," "thriller movie," "comedy movie," "science fiction movie," "action movie," "fantasy movie," and "melodrama movie."

"Exercise" may be a category of various items such as "football," "baseball," "basketball," "jogging," "cycling," "swimming," "workout," "climbing," "home training," and "golf." "SNS" may be a category of various items such as "Facebook," "Instagram," "Twitter," "Tumbler," and "Kakaostory."

The at least one item included in the first list may be "romance movie." When there is no information including the "romance movie" item among the information stored in the memory 130, the mediating device 100 may determine whether the memory 130 has an item belonging to the category "movie." For example, when there is an item of "comedy movie," the mediating device 100 may provide a mediation service between the first terminal 210 and the terminal providing the information including the item of "comedy movie."

Referring again to FIG. 16, in operation S460, the mediating device 100 may transmit information on categories to each of the first terminal 210 and the third terminal 250. For example, when an item provided by each of the first terminal 210 and the third terminal 250 belongs to the category of "movie," the mediating device 100 may transmit information on "movie" to the third terminal. In such a case, the first terminal 210 may display information on "movie." For example, the first terminal 210 may display text such as "WE BOTH LIKE MOVIES!" and an image related to "movie."

Figure 18:
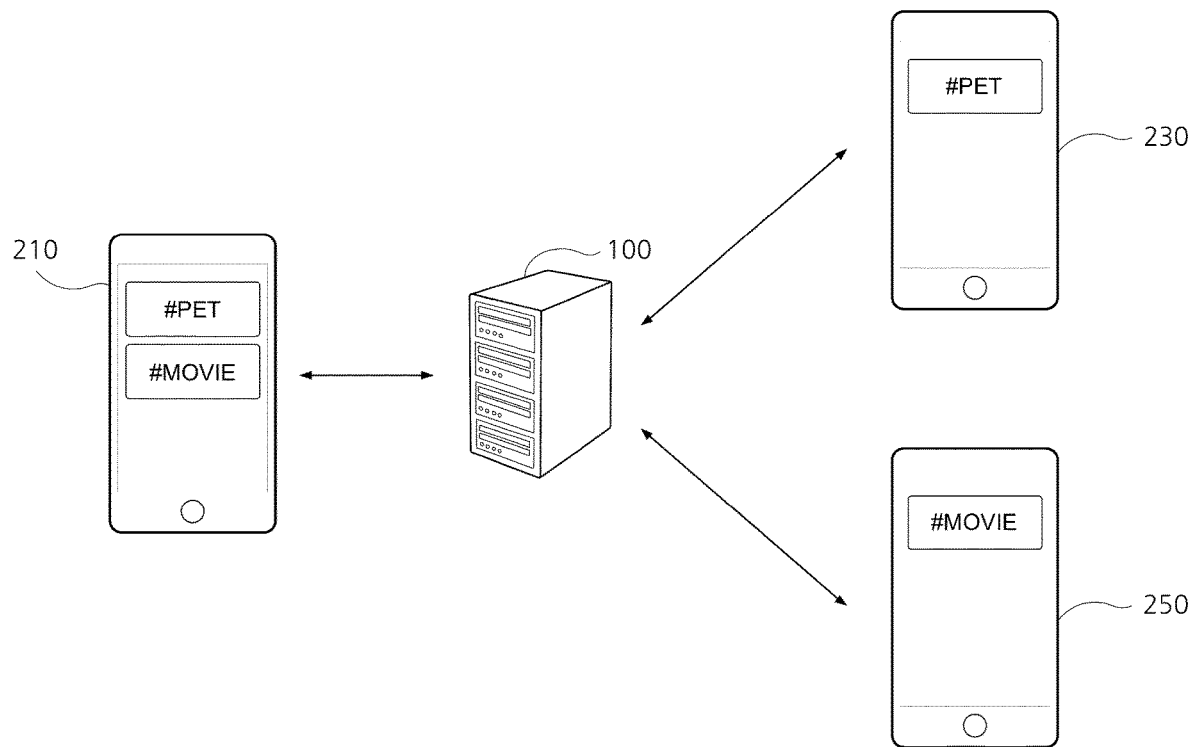
FIG. 18 is a reference view illustrating a method of adjusting the order by priority rank of at least one item in real-time according to an embodiment of the present disclosure.

FIG. 18 is a reference view illustrating a method of adjusting the order by priority rank of the at least one item in real-time according to an embodiment of the present disclosure. Referring to FIG. 18, the first terminal 210 may transmit the first list including items such as "pet" and "movie" to the mediating device 100. For example, "pet" may be the first-ranked item and "movie" may be the second-ranked item. The information on the item to which the priority rank is designated may be determined by the mediating device 100 or may be provided from the user of the first terminal 210. The first list may further include an item other than the items of "pet" and "movie."

The second terminal 230 may transmit the second list including the item of "pet" to the mediating device 100. For example, the item of "pet" may be the first-ranked item. The second list may further include an item other than the item of "pet." As another example, "pet" may be one among several items included in the second list. The third terminal 250 may transmit the third list including the item of "movie" to the mediating device 100. For example, the item of "movie" may be the first-ranked item. The third list may include an item other than the item of "movie." As another example, "movie" may be one among several items included in the third list.

The mediating device 100 may mediate the first terminal 210 and the at least one terminal 230 and 250 excluding the first terminal 210. The mediating device 100 may select the at least one terminal based on the first list received from the first terminal 210. For example, the mediating device 100 may select the at least one terminal based on the priority rank of the at least one item included in the first list. The mediating device 100 may select the at least one terminal based on the item of "pet," the first item of the first list. The mediating device 100 may mediate between the first terminal 210 and the second terminal 230 providing the second list including the item of "pet."

The user of the first terminal 210 and the user of the second terminal 230 may perform a video communication based on the mediation of the mediating device 100. When the video call between the first terminal 210 and the second terminal 230 is terminated, the mediating device 100 may select the next terminal to provide the mediation service to the first terminal 210. The mediating device 100 may select at least one terminal based on the item of "movie," which is the second-ranked item in the first list. The mediating device 100 may mediate between the first terminal 210 and the third terminal 250 providing the third list including the item of "movie."

The mediating device 100 may determine whether the priority rank of at least one item provided by the first terminal 210 matches the real satisfaction level of mediation. The mediating device 100 may calculate the satisfaction level of the user of the first terminal 210 while a video communication is performed between the first terminal 210 and the second terminal 230. The mediating device 100 may calculate the satisfaction level of the user of the first terminal 210 while a video communication is performed between the first terminal 210 and the second terminal 230.

For example, an index for calculating the satisfaction level may be based on at least one among a length of duration of a video communication, whether a user of the first terminal 210 transmits a request for social relationship formation to a user of the second terminal 230 or the third terminal 250, whether the user of the first terminal 210 accepts the request of social relationship formation received from the user of the second terminal 230 or the user of the third terminal 250, an amount of gifts or rewards transmitted to the user of the second terminal 230 or the third terminal 250 by the user of the first terminal 210 during the video communication, or the number of emoticons transmitted to the user of the second terminal 230 or the third terminal 250 by the user of the first terminal 210 during the video communication.

As another example, an index for calculating the satisfaction level may be based on at least one among the number of messages transmitted to the user of the second terminal 230 or the third terminal 250 by the user of the first terminal 210 during the video communication, whether the user of the first terminal 210 is silent, a pitch, loudness, and tone of the voice of the user of the first terminal 210 during the video communication, the number of laughing sounds detected in the voice of the user of the first terminal 210, the number of languages related to affection or hate detected in the message transmitted by the user of the first terminal 210, the number of languages related to affection or hate detected in the body language shown by the user of the first terminal 210, whether the user of the first terminal 210 exchanges the identification (ID) of a social networking service (SNS) or the phone number with the user of the second terminal 230 or the user of the third terminal 250, or whether the user of the first terminal 210 blocks or reports the user of the second terminal 230 or the user of the third terminal 250.

Based on the least one indicator of the satisfaction level, the mediating device 100 may calculate a first satisfaction level between the first terminal 210 and the second terminal 230 and a second satisfaction level between the first terminal 210 and the third terminal 250, respectively. For example, the mediating device 100 may calculate the first satisfaction while the user of the first terminal 210 and the user of the second terminal 230 perform a video communication. Further, the mediating device 100 may calculate the second satisfaction while the user of the first terminal 210 and the user of the third terminal 250 perform a video communication.

Since the user of the first terminal 210 thinks that he or she is more interested in "pet" than "movie," he or she may select "pet" and "movie," respectively, as the first-ranked item and the second-ranked item. However, as a result of the satisfaction level calculated by the mediating device 100, the second satisfaction level may be higher than the first satisfaction level. In other words, in the actual conversation, the user of the first terminal 210 may feel a greater satisfaction in conversation with a person having a common point about "movie" than a person having a common point about "pet."

The mediating device 100 may adjust the priority rank of the items of the first terminal 210 based on the calculated satisfaction level. For example, when the second satisfaction level is higher than the first satisfaction level, the mediating device 100 may designate the item of "romance" as a new first-ranked item in the first list and the item of "pet" as a new second-ranked item in the first list. Further, the mediating device 100 may match a terminal including the item of "romance" as a high-prioritized item to the first terminal by priority.

As described with reference to FIG. 18, the mediating device 100 may calculate the satisfaction level of the user of the terminal in real time. Further, the mediating device 100 may mediate the user of the other terminal to the user of the terminal based on the calculated satisfaction level. Therefore, the satisfaction level with the mediation felt by the user of the terminal may be further improved.

Figure 19:
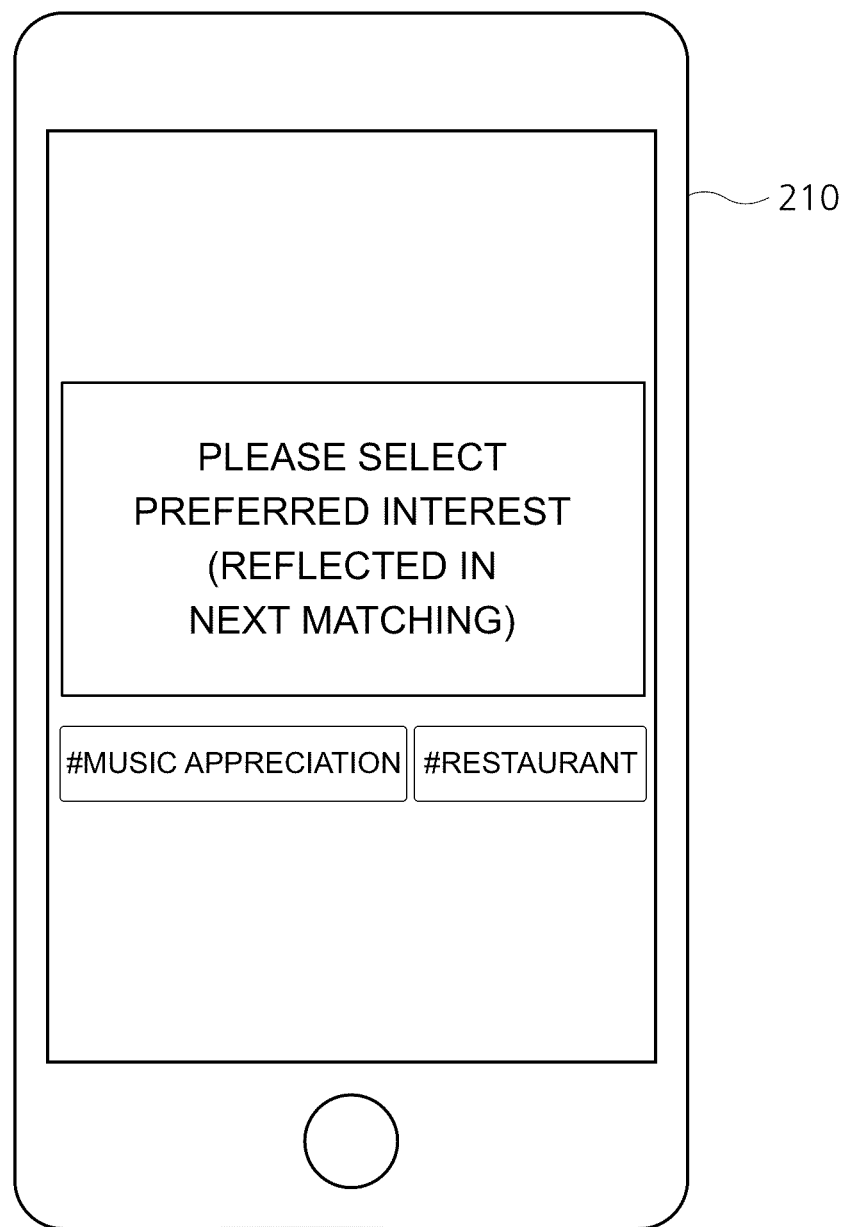
FIG. 19 is a reference view illustrating a method of displaying a question for acquiring additional items except for at least one item from a first terminal according to an embodiment of the present disclosure.

FIG. 19 is a reference view illustrating a method of displaying a question for acquiring additional items except the at least one item from the first terminal according to an embodiment of the present disclosure. Referring to FIG. 19, the mediating device 100 may transmit a question to the first terminal 210 to acquire additional items. For example, the mediating device 100 may transmit a text such as "PLEASE SELECT PREFERRED INTEREST! (REFLECTED IN NEXT MATCHING)" to the first terminal 210.

The mediating device 100 may transmit at least one item so that the user of the first terminal 210 may select the item. For example, the mediating device 100 may transmit items such as "music appreciation" and "restaurant" to the first terminal 210. The first terminal 210 may display the received text and items. The user of the first terminal 210 may generate a list of interests by selecting a more preferred item among the items of "music appreciation" and "restaurant." Those are only for the description of one embodiment for a description of the present disclosure, and the mediating device 100 may transmit various types of text and items to the first terminal 210. For example, the mediating device 100 may transmit a text such as "PLEASE ENTER YOUR INTERESTS!" to the first terminal 210 and may directly receive an item of interest from the user of the first terminal 210.

The mediating device 100 may periodically transmit a question for acquiring a list of interests to the first terminal 210. Further, after the first terminal 210 is mediated with one terminal, the mediating device 100 may transmit the question to the first terminal 210 during a waiting time before being mediated with the other terminal. Further, when the first terminal 210 connects to the mediating device 100, the mediating device 100 may transmit the question to the first terminal 210. For example, the mediating device 100 may transmit the question to the first terminal 210 whenever the first terminal 210 connects to the mediating device 100. However, the present disclosure is not limited to this, and the mediating device 100 may transmit the question to the first terminal 210 whenever the first terminal 210 connects to the mediating device 100 a specific number of times or more. Further, the mediating device 100 may randomly transmit the question to the first terminal 210, irrespective of the number of times the first terminal 210 connects to the mediating device 100. The mediating device 100 may select the next matching terminal based on the answer of the user of the first terminal 210.

The embodiment as described above may be embodied in a non-transitory computer-readable recording medium having recorded thereon computer-executable instruction codes, such as a program module executable by the computer. The non-transitory computer-readable recording medium may be any available medium which can be accessed by the computer and may include any volatile and non-volatile media and any removable and non-removable media.

Furthermore, the non-transitory computer-readable recording medium may include any computer storage medium and communication medium. The computer storage medium may include any volatile and non-volatile media or any removable and non-removable media embodied by a specific method or technology for storing information such as computer-readable instruction codes, a data structure, a program module, or other data. The communication medium may include computer-readable instruction code, a data structure, a program module, other data of modulated data signals, or other transmission mechanisms, and may include any information transmission medium.

At least one of the components, elements, modules or units (collectively "components" in this paragraph) represented by a block in the drawings, such as the controller 120, the list manager 121, and the mediator 122, may be embodied as various numbers of hardware, software and/or firmware structures that execute respective functions described above, according to an exemplary embodiment. For example, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Further, although a bus is not illustrated in the above block diagrams, communication between the components may be performed through the bus. Functional aspects of the above exemplary embodiments may be implemented in algorithms that execute on one or more processors. Furthermore, the components represented by a block or processing steps may employ any number of related art techniques for electronics configuration, signal processing and/or control, data processing and the like.

It should be understood that embodiments described herein should be considered in a descriptive sense only and not for purposes of limitation. Descriptions of features or aspects within each embodiment should typically be considered as available for other similar features or aspects in other embodiments.

DESCRIPTION OF REFERENCE NUMBERS

100: mediating device
110: input/output interface
120: controller
130: memory
210, 230, 250: terminal

The invention claimed is:

1. A non-transitory computer-readable recording medium having recorded thereon a program for executing a mediating method comprising:
   receiving a first list including at least one item from a first terminal, and receiving at least one list from at least one terminal different from the first terminal;
   searching a second list including an item corresponding to a first-ranked item among the at least one item included in the first list among the received at least one list;
   mediating between the first terminal and a second terminal providing the second list to perform a first video communication according a result of the search;
   calculating a first satisfaction level of a user of the first terminal during the first video communication;
   searching for, after the first video communication is finished, a third list including an item corresponding to a second-ranked item among the at least one item included in the first list among the received at least one list;
   mediating between the first terminal and a third terminal providing the third list to perform a second video communication according a result of the search;
   calculating a second satisfaction level of a user of the first terminal during the second video communication;

comparing the first satisfaction level and the second satisfaction level;
adjusting a priority rank of the first-ranked item and the second-ranked item according to the result of the comparison; and
storing the first list through the third list.

2. A mediating device comprising:
an input/output interface configured to receive a first list including at least one item from a first terminal and to receive at least one list from at least one terminal different from the first terminal;
a controller configured to:
  search a second list including an item corresponding to a first-ranked item among the at least one item included in the first list among the received at least one list;
  mediate between the first terminal and a second terminal providing the second list to perform a video communication according a result of the search;
  calculate a first satisfaction level of a user of the first terminal during the first video communication;
  search for, after the first video communication is finished, a third list including an item corresponding to a second-ranked item among the at least one item included in the first list among the received at least one list;
  mediate between the first terminal and a third terminal providing the third list to perform a second video communication according a result of the search;
  calculate a second satisfaction level of a user of the first terminal during the second video communication;
  compare the first satisfaction level and the second satisfaction level; and
  adjust a priority rank of the first-ranked item and the second-ranked item according to the result of the comparison; and
a memory configured to store the first list through the third list.

3. The mediating device of claim 2, wherein the controller adjusts the second-ranked item of the first list to a new first-ranked item, and adjusts the first-ranked item to a new second-ranked item when the second satisfaction level is higher than the first satisfaction level.

4. The mediating device of claim 2, wherein the first satisfaction level is calculated based on duration of the first video communication, and the second satisfaction level is calculated based on duration of the second video communication.

5. A mediating method comprising:
receiving a first list including at least one item from a first terminal, and receiving at least one list from at least one terminal different from the first terminal;
searching a second list including an item corresponding to a first-ranked item among the at least one item included in the first list among the received at least one list;
mediating between the first terminal and a second terminal providing the second list to perform a first video communication according a result of the search;
calculating a first satisfaction level of a user of the first terminal during the first video communication;
searching for, after the first video communication is finished, a third list including an item corresponding to a second-ranked item among the at least one item included in the first list among the received at least one list;
mediating between the first terminal and a third terminal providing the third list to perform a second video communication according a result of the search;
calculating a second satisfaction level of a user of the first terminal during the second video communication;
comparing the first satisfaction level and the second satisfaction level;
adjusting a priority rank of the first-ranked item and the second-ranked item according to the result of the comparison; and
storing the first list through the third list.

6. The mediating method of claim 5, further comprising:
adjusting the second-ranked item of the first list to a new first-ranked item; and
adjusting the first-ranked item to a new second-ranked item when the second satisfaction level is higher than the first satisfaction level.

7. The mediating method of claim 5, wherein the first satisfaction level is calculated based on duration of the first video communication, and the second satisfaction level is calculated based on duration of the second video communication.

* * * * *